(12) United States Patent
Mott et al.

(10) Patent No.: US 11,710,982 B2
(45) Date of Patent: Jul. 25, 2023

(54) SOLAR POWER SAFETY EDGE SYSTEM FOR SLIDING GATES

(71) Applicants: William Charles Mott, Holden, MA (US); Robert Bedard, Holden, MA (US)

(72) Inventors: William Charles Mott, Holden, MA (US); Robert Bedard, Holden, MA (US)

( * ) Notice: Subject to any disclaimer, the term of this patent is extended or adjusted under 35 U.S.C. 154(b) by 0 days.

(21) Appl. No.: 17/813,751

(22) Filed: Jul. 20, 2022

(65) Prior Publication Data

US 2023/0024330 A1 Jan. 26, 2023

Related U.S. Application Data

(60) Provisional application No. 63/203,377, filed on Jul. 20, 2021.

(51) Int. Cl.
| | |
|---|---|
| *H02J 7/35* | (2006.01) |
| *H02J 7/34* | (2006.01) |
| *H02S 30/00* | (2014.01) |

(52) U.S. Cl.
CPC .............. *H02J 7/35* (2013.01); *H02J 7/342* (2020.01); *H02J 2300/20* (2020.01); *H02S 30/00* (2013.01)

(58) Field of Classification Search
CPC ...... H02J 7/35; H02J 7/34; H02J 7/342; H02J 2300/20; H02S 30/00
See application file for complete search history.

(56) References Cited

U.S. PATENT DOCUMENTS

| | | |
|---|---|---|
| 4,416,085 A | 11/1983 | Lybecker et al. |
| 4,638,597 A | 1/1987 | Lybecker |
| 4,658,543 A | 4/1987 | Carr |
| 4,735,018 A | 4/1988 | Duncan et al. |
| 4,750,295 A | 6/1988 | Court et al. |
| 4,782,628 A | 11/1988 | Gaddis |
| 4,850,094 A | 7/1989 | Lybecker |
| 9,725,941 B2 | 8/2017 | Van Tassell, III |
| 11,274,486 B2 | 3/2022 | Ladani et al. |
| 2011/0225885 A1 | 9/2011 | Van Tassell |
| 2013/0221305 A1 | 8/2013 | Dilworth et al. |
| 2014/0259930 A1 | 9/2014 | Gilliam |
| 2020/0347660 A1 | 11/2020 | Ladani et al. |
| 2020/0386029 A1 | 12/2020 | Nash |
| 2021/0317696 A1 | 10/2021 | Hall et al. |

*Primary Examiner* — Robert L Deberadinis
(74) *Attorney, Agent, or Firm* — Dunlap Bennett & Ludwig, PLLC

(57) ABSTRACT

A system for powering a sliding gate including a solar power assembly with a solar panel in electronic communication with a device for regulating voltage and a high-capacity battery electronically connected to the device for regulating voltage, and a safety edge with a sensor wherein the safety edge is configured to receive power independently from both the device for regulating voltage and the high-capacity battery.

9 Claims, 3 Drawing Sheets

US 11,710,982 B2

SOLAR POWER SAFETY EDGE SYSTEM FOR SLIDING GATES

CROSS-REFERENCE TO RELATED APPLICATION

This application claims the benefit of priority of U.S. provisional application No. 63/203,377, filed Jul. 20, 2021, the contents of which are herein incorporated by reference.

BACKGROUND OF THE INVENTION

The present invention relates to wireless sliding gates, and more particularly, to a universal solar charging, storage, operating power system for a wireless sliding gate safety edge.

Sliding gates move from side to side, which makes it difficult to attach a direct current source thereto such as power from an extension cord. To attach a direct power source to a sliding gate, a user would need a retractable cord system of sorts which would have a potential maintenance, safety, and failure issues.

Currently, sliding gate operators require a constantly-on safety edge. Most sliding gate operators use a wireless 2 AA Battery system which needs constant maintenance. For example, currently available wireless safety edge systems are only available with a replaceable lithium battery power source which needs constant monitoring for a low battery status and replacement of said batteries.

A solution is needed capable of providing a power source that would not need a retractable cord system. As can be seen, there is a need for a solar power safety edge system.

SUMMARY OF THE INVENTION

In one aspect of the present invention, a system for powering a sliding gate comprises a solar power assembly comprising a solar panel in electronic communication with a device configured to regulate voltage and a high-capacity battery electronically connected to the device configured to regulate voltage, and a safety edge with a sensor wherein the safety edge is configured to receive power independently from both the device configured to regulate voltage and the high-capacity battery.

In another aspect of the present invention, a method of operating a sliding gate comprising collecting energy from sunlight with a solar panel, converting the energy to a direct current (DC), regulating a voltage of the DC with a device configured to regulate voltage, charging a high-capacity battery with the DC, operating a sensor on the sliding gate with DC from the device configured to regulate voltage when an adequate amount of sunlight is available, and operating the sensor of the sliding gate with DC from the high-capacity battery when an adequate amount of sunlight is not available.

These and other features, aspects and advantages of the present invention will become better understood with reference to the following drawings, description, and claims.

DETAILED DESCRIPTION OF THE INVENTION

Figure 1:
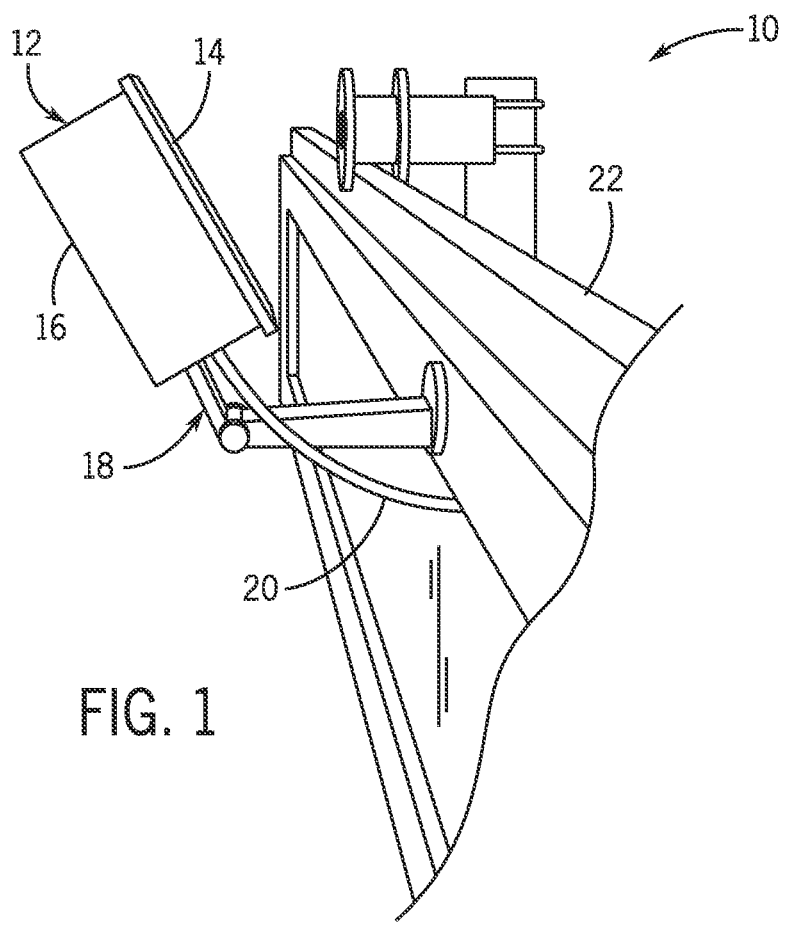
FIG. 1 is a side perspective view of a solar panel mounted on a safety gate according to an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims with reference to the drawings.

Broadly, an embodiment of the present invention provides a solar charging power system for a wireless sliding gate with a safety edge without a direct power cord or extension cord to power the safety edge. The present invention may be implemented on or retrofitted onto existing sliding gates with safety edges. Safety edges may be portions of or devices attached to sliding gates configured to detect an obstacle and stop/reverse directions upon detection of said obstacle.

The system of the present invention may provide a constant power source without a direct cord for a safety edge. The present invention provides a solar charger which may provide a low maintenance, constant power source capable of powering the safety edge directly without requiring a disposable battery, while providing a trickle charging, internal high-capacity battery for use when solar power is not available, such as nighttime use.

The system of the present invention distinguishes over and differs from what currently exists. Currently wireless safety edge systems are only available with a replaceable, battery power source, such as a rechargeable battery or a disposable battery. Said batteries require monitoring for a low battery status and replacing/recharging the batteries upon when the battery is sufficiently low or empty. To attach a direct power source to a sliding gate, a user would need a retractable cord system of sorts which would have potential maintenance, safety, and failure issues.

In some embodiments, the present invention may provide a solar powered wireless safety edge system comprising one or more of the following elements or components and combinations thereof: a solar panel, a solar charger circuit, a device configured to regulate voltage, a battery (such as a high-capacity lithium battery), wire (such as a thirty foot wire), battery adaptor connections, an adjustable pedestal base (such as a polyvinyl chloride (PVC) base adjustable in 360 degrees), a light emitting diode (LED) power notification light, a battery retainer clip, a reinforcement plate, and a battery bank adaptor.

The elements or components may interrelate in the following manner. Energy from the solar panel may flow into the solar charger circuit. The solar charger circuit may assist in regulating a voltage received from the solar panel. Energy may then flow at a voltage from the solar charger circuit into a device configured to regulate voltage to conform to a power stream of a proper energy level and voltage. This power stream powers the safety edge system, providing power during daylight, while simultaneously charging a high-capacity battery for nighttime use.

A connection cord enables the solar charger to be mounted to a side opposite or away from the safety edge for protection. AA batteries in conjunction with a battery adapter may be optional. The battery adapter enables switching from two AA batteries to the solar charger. The AA batteries may power the safety edge before power can be distributed from the solar charger. As such, the AA battery may serve as a back-up battery and may be utilized before adequate power has been received by the solar panel or when the high-capacity battery does not have an adequate charge.

The solar charger circuit, the device configured to regulate voltage, and the high-capacity battery may all be contained in a work box. The work box may be a PVC work box. The pedestal, or mount, may mount the unit to a gate. The LED power notification light may be placed on the work box. The LED power notification light may provide power notification and activate or power on to acknowledge or alert a user of proper operation. The battery retainer clip may hold the high-capacity battery in place on or in the work box. The reinforcement plate may reinforce and strengthen the work box floor for attachment of the pedestal.

The device configured to regulate voltage may be a buck regulator or a buck converter. Said device may be a DC-to-DC power converter which steps down voltage. The device configured to regulate may optionally be a boost converter (used to raise or lower output) or a potentiometer (used to manually adjust output by a switch). The device configured to regulate voltage may optionally be utilized to attain an optimum or adequate output voltage. The optimum or the adequate output voltage may vary depending on a model of the safety edge.

In some embodiments, the system may work or function in the following manner. The solar panel may collect and convert sunlight to a usable direct current (DC) voltage. A charging board charges the high-capacity battery via a buck regulator which regulates the voltage to ensure a proper voltage power stream. The buck regulator and/or the high-capacity battery supply the safety edge with power. The buck regulator may provide power and operate the safety edge when sunlight or an adequate amount of sunlight is available. The high-capacity battery may provide power and operate the safety edge when sunlight is not available or when an adequate amount of sunlight is not available. An adequate amount of sunlight may be enough sunlight to power and operate the safety edge via the solar panel and charging board.

The safety edge may receive power from both the device configured to regulate voltage and the high-capacity battery independently and/or simultaneously.

The LED light indicates that the voltage power stream is present. The LED light may be optional and utilized to quickly check if the unit is putting out a voltage.

In some embodiments, by adding additional solar panels, appropriate charging boards, additional buck regulators, and larger battery packs, more wattage and output voltages may be obtained, allowing for a much larger field of equipment to be serviced.

The system unit may be provided for purchase with all accessories for a universal installation on most wireless safety edge systems and sliding gates. The solar charger may be mounted close to, or in some embodiments, 30 feet away on the opposite side of a gate, using its pedestal mounting base. The connecting wire from solar charger to safety edge may be cut to size for a custom finished look. The wire may be passed into the safety edge battery compartment. In some embodiments, the edge battery compartment may have access ports. In other embodiments, a ¼" hole may be drilled through the case for access to the battery compartment. The wires may be wing-nutted to a battery adapter providing connections to the safety edge system and a rechargeable/replaceable battery. The battery adapter may be a dummy battery adapter. Once the battery adapter is installed in the battery case, the unit may be capable of powering the safety edge system with sunlight.

In some embodiments, the system of the present invention may be used for additional applications. For example, the system may be used while camping, hiking, hunting, at the beach or other locations, to charge or power a multitude of different portable devices through slight manufacturing changes. A few nonlimiting examples may include gaming, cameras, global positioning (GPS) units, low voltage lights, and smartphones.

Figure 2:
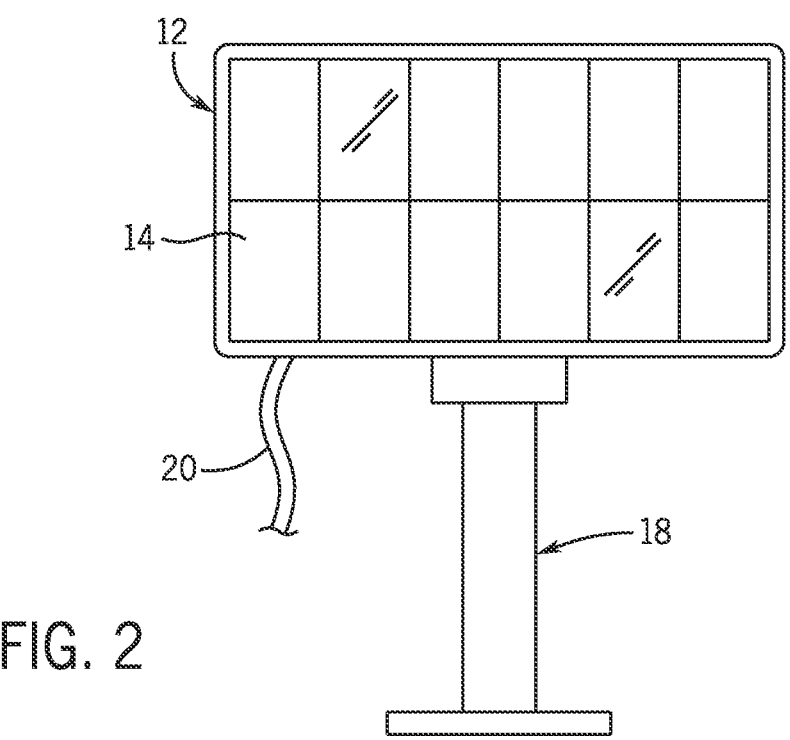
FIG. 2 is a top view of the solar panel thereof.
Figure 3:
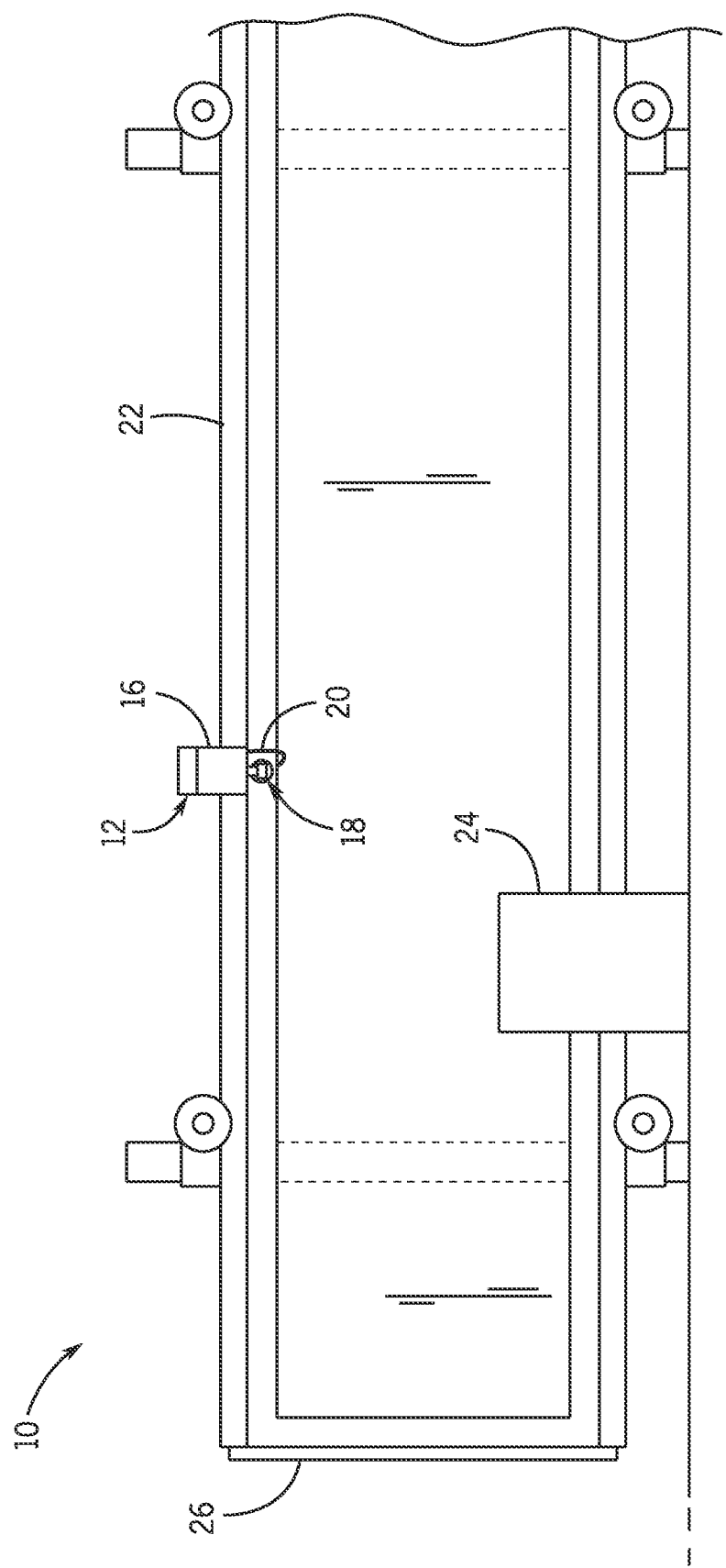
FIG. 3 is a front view of a safety gate thereof.

Referring now to FIGS. 1 through 3, a solar power safety edge system 10 is provided according to an embodiment of the present invention. The system 10 includes a solar power assembly 12 comprising a solar panel 14 and a work box 16. The work box 16 may include a reinforcement plate (not pictured) at an end where affixed to a mounting assembly 18. The solar power assembly 12 is affixed to a sliding fence 22 by the mounting assembly 18. The mounting assembly 18 may be adjustable in length and provide a mechanism for tilting or angling the solar power assembly 12 for receiving a maximum amount of sunlight. A wire 20 provides power from the solar power assembly 12 to a safety edge 26.

As best seen in FIG. 3, a motor 24 is attached to the sliding fence 22. The safety edge 26 is attached to an end of the sliding fence 22.

Figure 4:
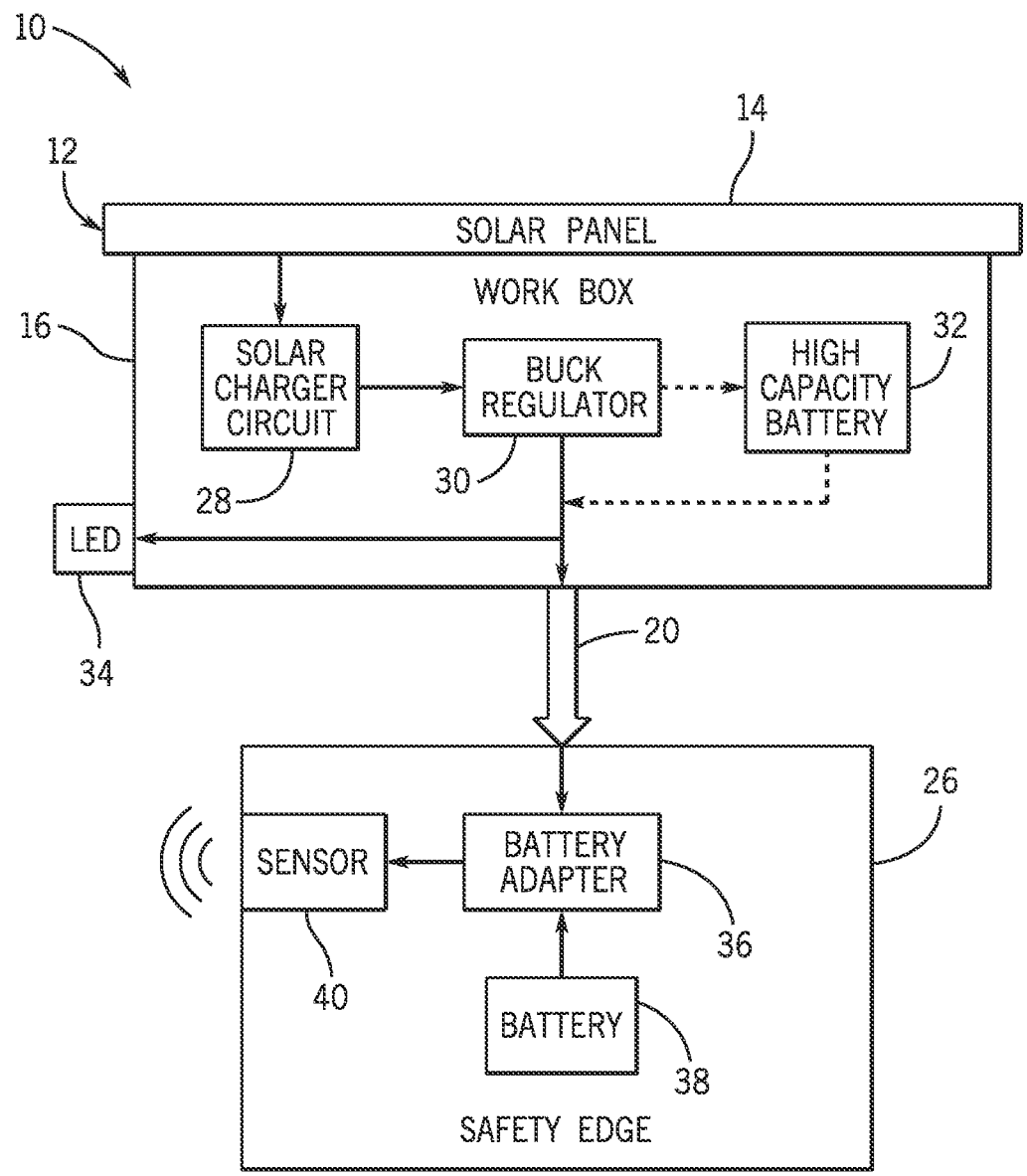
FIG. 4 is a schematic diagram of an embodiment of the present invention.

FIG. 4 depicts a schematic view of the system 10 according to an embodiment of the present invention. The work box 16 houses a solar charger circuit 28, a buck regulator 30, and a high-capacity battery 32. A light emitting diode (LED) is affixed to an outside surface of the work box 16. The solar charger circuit 28 is in electronic communication with the buck regulator 30. The buck regulator 30 is in electronic communication with the high-capacity battery 32.

In some embodiments of the present invention, the work box 16 may include a boost converter to step up a voltage or a potentiometer to manually adjust voltage. They may replace or work in conjunction with the buck regulator 30.

The wire 20 electronically connects the work box 16, and components therein, to the safety edge 26. The safety edge includes a battery 38 and a battery adapter 36 electronically connected to a sensor 40. The sensor 40 is in electronic communication with the battery 38 via the battery adapter 36.

It should be understood, of course, that the foregoing relates to exemplary embodiments of the invention and that modifications may be made without departing from the spirit and scope of the invention as set forth in the following claims.

What is claimed is:

1. A system for powering a sliding gate comprising:
   a solar power assembly comprising a solar panel in electronic communication with a device configured to regulate voltage of a direct current (DC) and a high-capacity battery electronically connected to the device configured to regulate voltage; and
   a safety edge with a sensor wherein the safety edge is configured to receive power independently from both the device configured to regulate voltage and the high-capacity battery.

2. The system of claim 1, wherein the solar panel further comprises a light emitting diode (LED) configured to alert a user when the system has power.

3. The system of claim 1, wherein the device configured to regulate voltage, and the high-capacity battery are housed within a work box of the solar power assembly.

4. The system of claim 1, wherein the device configured to regulate voltage is a buck regulator.

5. The system of claim 1, wherein the device configured to regulate voltage is a boost converter.

6. The system of claim 1, wherein the device configured to regulate voltage is a potentiometer.

7. The system of claim 1, wherein the safety edge comprises a battery adapter and a disposable battery in electronic communication with a sensor of the safety edge.

8. A method of operating a sliding gate comprising:
collecting energy from sunlight with a solar panel;
converting the energy to a direct current (DC);
regulating a voltage of the DC with a device configured to regulate voltage;
charging a high-capacity battery with the DC;
operating a sensor on the sliding gate with DC from the device configured to regulate voltage when an adequate amount of sunlight is available; and
operating the sensor of the sliding gate with DC from the high-capacity battery when an adequate amount of sunlight is not available.

9. The method of claim 8, further comprising activating an LED with the DC.

\* \* \* \* \*